United States Patent Office 3,219,672
Patented Nov. 23, 1965

3,219,672
17α-ALKYLATED STEROIDS OF THE PREGNANE
SERIES AND THEIR PREPARATION
Romano Deghenghi, Westmount, Quebec, Canada, assignor to American Home Products Corporation, New York, N.Y., a corporation of Delaware
No Drawing. Filed Mar. 19, 1963, Ser. No. 266,204
Claims priority, application Canada, Mar. 23, 1962, 845,095
12 Claims. (Cl. 260—397.3)

This invention relates to 17α-alkylated steroids of the pregnane series and to processes by which they may be prepared.

The present invention relates, in part, to a process for the direct alkylation of certain steriods of the pregnane series in position 17 to obtain 17-alkylated steriods which possess useful progestational activity. Some of these compounds, for example, 17α-methylprogesterone or 6α,17α-dimethylprogesterone, are known to possess valuable biological activities, especially progestational activity of a high order accompanied by the absence of undesirable side-effects (cf. Deghenghi and Gaudry, J. Am. Chem. Soc., 83, 4668 (1961)). This invention also relates to other 17-alkylated steroids which are useful as intermediates in the preparation of the said progestationally active compounds.

The direct alkylation of steroids in position α to a ketone is well known in the literature (cf. E. Toromanoff, Bull. Soc. Chim. France, 1960, 888). A steroidal carbanion is formed, generally by the action of a strong base, which then reacts with an alkylating agent, as for instance methyl iodide, yielding the corresponding alkyl ketone. However, both the α and α' positions (vicinal to a ketone) may be the site for carbanions and both positions may, therefore, be alkylated. Selective alkylations are usually possible by blocking one of the α positions with a suitable group, like the n-butylthiomethylene group (cf. Ireland, J. Am. Chem. Soc., 81, 6336 (1959)) which is subsequently removed after the alkylation at the desired position has occurred.

Stork et al. (J. Am. Chem. Soc., 83, 2965 (1961)) have succeeded in alkylating, directly and without protecting or activating groups, and α,β-unsaturated ketone in the decalone series. This alkylation method, performed in lithium-liquid ammonia solution, has the unique feature to develop the "less stable" of the two possible carbanions and to introduce, therefore, the alkyl group at that position.

Schaub et al. (Chem. and Ind., 1961, 2003) have repeated Stork's alkylation in the steroid field and confirmed that treatment of a Δ⁴-3 ketone in lithium-liquid ammonia resulted in the formation of the less stable anion which was then alkylated with methyl iodide to obtain the 4-methyl derivative.

In the case of steroidal 20-ketones, the less stable of the two possible carbanions formed vicinal to the ketone group is located in position 21. This is evidenced by the well known enol acetate formation in which only the more stable carbanion in position 17 can be isolated (cf. Deghenghi and Engel, J. Am. Chem. Soc., 82, 3201 (1960)), and by the rapid and irreversible isomerization of a carbanion in position 21 to the more stable carbanion in position 17 (cf. Ott et al., U.S. Patent 2,694,078, and Wendler et al., Tetrahedron 3, 149 (1958)).

According to the work of Stork et al. and of Schaub et al. (both cited above) it should be expected that alkylation of a steroidal α,β-unsaturated 20-kentone in a solution of lithium in liquid ammonia should occur at the site of the less stable carbanion, i.e. in position 21.

Contrary to those considerations, it has now been found that alkylation of a steroidal Δ¹⁶-20-ketone occurs substantially only in position 17.

Thus, treatment of 16-dehydropregnenolone or of its corresponding 6-methyl derivative with an alkylating agent in a solution of an alkali metal in liquid ammonia resulted in the smooth formation of the corresponding 17α-alkylated pregnenolones, according to the following sequence:

A 16-dehydro-20-ketopregnene (I) in solution in a nonhydroxylated solvent miscible with liquid ammonia and inert to alkali metal dissolved therein, for example, an ether such as diethyl ether or diethylene glycol dimethyl ether, or in a cyclic ether, for example, tetrahydrofuran, was added to a solution of lithium in liquid ammonia, and an alkyl halide such as, for example, methyl iodide or ethyl iodide, was added to the mixture. The resulting mixture after evaporation of the ammonia was extracted with ether, washed to neutrality with water, and the solvent evaporated. The intermediate 17α-alkyl-20-keto-pregnene (II) was obtained in the crude state as an oil. It was then either purified through its acetate, for example, by chromatography of the latter and subsquent hydrolysis; or, alternatively, the crude or the purified 17α-alkyl-20-keto-pregnene (II) was subjected to an Oppenauer oxidation to yield the corresponding 17α-alkyl-progesterone (III).

In this manner, when starting with 16-dehydropregnenolone acetate (Elsevier's Encyclopaedia of Organic Chemistry, 1959, vol. 14, supplement page 2230 s) ((I) R=Ac, X=H) and methyl iodide, there was obtained the known 17α-methylpregnenolone ((II) R=X=H, R'=CH$_3$) and its corresponding acetate ((II) R=Ac, X=H, R'=CH$_3$); the known 17α-methylprogesterone ((III) X=H, R'=CH$_3$) was obtained from the former compound by known means.

Alternatively, the alkylation of 16-dehydropregnenolone with ethyl iodide yielded the new compound 17α-ethylpregnenolone ((II) R=X=H, R'=C$_2$H$_5$), and its corresponding acetate ((II) R=Ac, X=H, R'=C$_2$H$_5$); the new compound 17α-ethylprogesterone ((III) X=H, R'=C$_2$H$_5$) was obtained from the former compound by known means.

In a similar manner 16-dehydro-6-methylpregnenolone acetate (Burn et al., J. Chem. Soc., 1957, 4092) ((I) R=Ac, X=CH$_3$) and methyl iodide yielded the new compound 6,17α - dimethylpregnenolone ((II) R=H, X=R'=CH$_3$) and its corresponding acetate ((II) R=Ac, X=R'=CH$_3$); the former compound was subjected to the well known Oppenauer oxidation to yield the known 6α,17α-dimethylprogesterone ((III) X=R'=CH$_3$).

In an analogous manner, alkylation of 16-dehydro-6-methylpregnenolone acetate with ethyl iodide yielded the new compounds 6-methyl-17α-ethylpregnenolone ((II) R=H, X=CH$_3$, R'=C$_2$H$_5$) and its corresponding acetate ((II) R=Ac, X=CH$_3$, R'=C$_2$H$_5$); the new compound 6α - methyl - 17α - ethylprogesterone ((III) X=CH$_3$, R'=C$_2$H$_5$) was obtained from the former compound by known means.

The following formulae in which R in Formula I represents acyl, and in Formula II represents hydrogen or acyl, X represents hydrogen or methyl, and R' represents lower alkyl, and examples will illustrate the present invention.

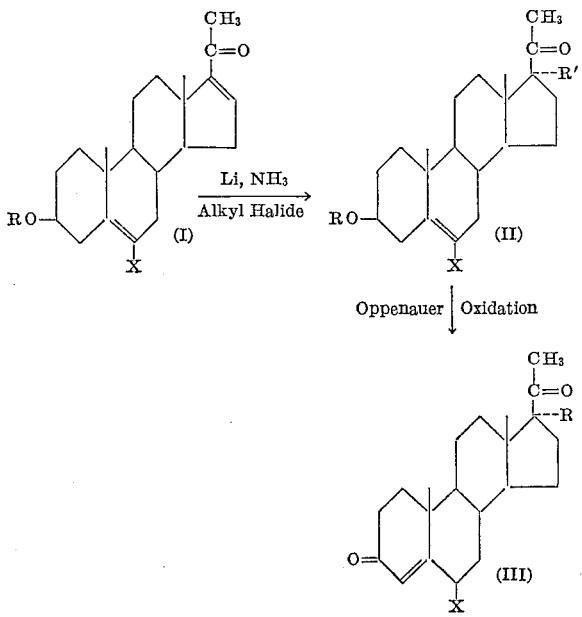

EXAMPLE 1

17α-methylpregnenolone and its acetate

To a solution of 1.3 g. of lithium in 250 cc. liquid ammonia (Dry Ice-acetone bath) there was added, dropwise with stirring, a solution of 5.0 g. of 6-dehydropregnenolone acetate in 100 cc. dry tetrahydrofuran. Following the addition of the steroid, a solution of 20 cc. methyl iodide in 60 cc. ether was cautiously added dropwise. More ether (100 cc.) was added and stirring was continued for fifteen minutes. The mixture was extracted with ether, washed to neutrality, dried and evaporated to give 4.82 g. of crude 17α-methylpregnenolone as an oil. The latter was treated with 5 cc. acetic anhydride in 20 cc. pyridine for one hour on a steam bath, extracted with ether, and washed to neutrality. Evaporation of the organic layer gave 5.2 g. of a crude mixture which was chromatographed on 150 g. neutral alumina. Petroleum ether-benzene fraction eluted the product, 17α-methylpregnenolone acetate, which was recrystallized from ether-methanol to M.P. 181–183° C.

A sample of the above pure 17α-methylpregnenolone acetate was hydrolyzed in methanol containing sodium hydroxide to give 17ω-methylpregnenolone, M.P. 175° C., identical with an authentic sample.

EXAMPLE 2

17α-methylprogesterone

A sample of 0.855 g. of 17α-methylpregnenolone obtained as in Example 1, was dissolved in 50 cc. of toluene and 10 cc. of cyclohexanone. A quantity of 1.0 g. of aluminium isopropoxide was added and the mixture refluxed for one hour when the usual working up gave 0.815 g. of crude 17α-methylprogesterone, which was recrystallized from hexane to give the pure product, M.P. 131–135° C., identical with an authentic sample.

EXAMPLE 3

6,17α-dimethylpregnenolone and its acetate

To a solution of 1.0 g. lithium in 150 cc. liquid ammonia (Dry Ice-acetone bath) there was added dropwise while stirring a solution of 1.0 g. of 16-dehydro-6-methylpregnenolone acetate in 30 cc. tetrahydrofuran, followed by 10 cc. of methyl iodide in 40 cc. ether.

The mixture was worked up as in Example 1 to give 0.970 g. of an oil representing crude 6,17α-dimethylpregnenolone $\nu$CHCl$_3$ 3600 cm.$^{-1}$ (OH) 1693 cm.$^{-1}$ (20-ketone).

Acetylation in the usual manner and purification of the acetylated product by chromatography afforded 6,17α-dimethylpregnenolone acetate, M.P. 137–138° C. [α]$_D^{24}$ —65 (1 percent in chloroform).

Alkaline hydrolysis of the above acetate in the usual manner afforded pure 6,17α-dimethylpregnenolone recrystallized from acetone to M.P. 185–187° C. [α]$_D^{24}$ —61.5 (1 percent in chloroform).

EXAMPLE 4

6α,17α-dimethylprogesterone 6,17α-dimethylpregnenolone, as obtained in Example 3, was dissolved in 50 cc. toluene and 10 cc. cyclohexanone. Twenty cc. of toluene were distilled off and 1.0 g. of aluminum isoproproxide added, and the mixture refluxed for one hour.

Rochelle salt solution was added to the mixture which was then steam distilled to remove the solvents. The residue was isolated by extraction and purified by chromatography on 30 g. neutral alumina.

Petroleum ether-benzene fractions eluted 6α,17α-dimethylprogesterone identical with an authentic sample, M.P. 137–139° C. after crystallization from acetone-hexane.

EXAMPLE 5

17α-ethylpregnenolone acetate

To a solution of 1.3 g. of lithium in 250 ml. liquid ammonia there was added dropwise a solution of 5.0 g. 16-dehydropregnenolone acetate in 100 ml. tetrahydrofuran, followed by a solution of 20 ml. ethyl iodide in 60 ml. ether. The resulting suspension was stirred for twenty minutes, the ammonia replaced by additional quantities of ether. The mixture was extracted with ether, washed to neutrality, and the product reacetylated overnight in 5 cc. acetic anhydride in 20 cc. pyridine at room temperature. Chromatography over neutral alumina (150 g.) afforded the title compound, M.P. 178–180° C. (from hexane) [α]$_D^{24}$ —61 (1 percent in chloroform).

EXAMPLE 6

17α-ethylpregnenolone

The title compound was obtained by alkaline hydrolysis of the corresponding acetate (as obtained in Example 5) in the usual manner, M.P. 200–202° C. (from acetone) [α]$_D^{24}$ —65 (1 percent in chloroform).

EXAMPLE 7

17α-ethylprogesterone

The title compound was obtained by Oppenauer oxidation of the above described 17α-ethlypregnenolone in the usual manner, M.P. 148–150° C. (from hexane) [α]$_D^{24}$ +93 (1 percent in chloroform). $\lambda$ Max. 241 m$\mu$, $\epsilon$=19,000.

EXAMPLE 8

6-methyl-17α-ethylpregnenolone and its acetate

Following the procedure given in Example 3, 6-methyl-16-dehydropregnenolone acetate (15 g.) dissolved in 300 cc. of tetrahydrofuran were added to a solution of 3.9 g. of lithium in 750 cc. of liquid ammonia. A solution of 50 cc. of ethyl iodide in 180 cc. dry ether was added to the previous mixture. Usual working up gave 15.15 g. of amorphous material which was reacetylated in the usual manner with 15 cc. of acetic anhydride in 60 cc. of pyridine at room temperature. Usual work up, followed by chromatographic purification, afforded 6-methyl-17α-ethylpregnenolone acetate, M.P. 141–143° C. (from acetone).

Hydrolysis of this compound in the usual manner afforded 6-methyl-17α-ethylpregnenolone, M.P. 233–237° C. (from acetone).

EXAMPLE 9

6α-methyl-17α-ethylrprogesterone

Oppenauer oxidation of 6-methyl-17α-ethylpregnenolone, as obtained above, afforded 6α-methyl-17α-ethylprogesterone, M.P. 149–151° C. (from ether).

EXAMPLE 10

17α-n-propylpregnenolone acetate

By substituting n-propyl iodide as the alkylating agent in the procedure disclosed in Example 5, the title compound was secured, M.P. 168–171, [α]_D −66.7 (CHCl₃).

EXAMPLE 11

17α-n-propylprogesterone

The above described acetate (Example 10) was hydrolyzed to the corresponding alcohol as in Example 6, and this was oidized according to Oppenauer to give the title compound, M.P. 153–155 [α]_D +88.9, λ Max. 240 mμ, ε=17,200.

EXAMPLE 12

17α-n-butyl pregnenolone acetate

The title substance was prepared with n-butyl iodide as the alkylating agent, according to the method of Example 5, M.P. 145–146 [α]_D +10 (CHCl₃).

I claim:

1. A process for preparing 17α-alkylated pregnane derivatives comprising bringing together a steroidial α,β-unsaturated 20-ketone of the general formula

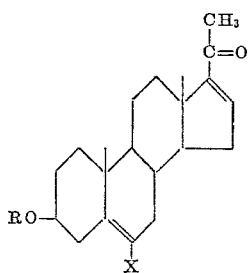

where R is acyl and X is selected from the group consisting of hydrogen and methyl, dissolved in a non-hydroxylated solvent miscible with liquid ammonia and inert to alkali metal dissolved therein, with a solution of an alkali metal in liquid ammonia and with a lower alkyl halide thereby to form the corresponding 17α-alkylated pregnenolone, and treating said latter compound under the conditions of the Oppenauer oxidation to form the corresponding 17α-alkylated progesterone.

2. A process as defined in claim 1 in which the solvent is selected from the group consisting of ethers and cyclic ethers.

3. A process for preparing 17α-alkylated pregnane derivatives comprising bringing together a steroidial α,β-unsaturated 20-ketone of the general formula

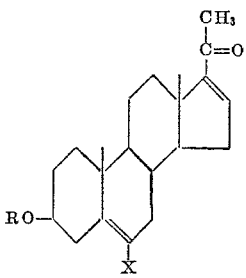

in which R and X have the significance mentioned above, dissolved in a nonhydroxylated solvent miscible with liquid ammonia and inert to alkali metal dissolved therein, with a solution of an alkali metal in liquid ammonia and with a lower alkyl halide thereby to form the corresponding 17α-alkylated pregnenolone.

4. A process as defined in claim 3 in which the solvent is selected from the group consisting of ethers and cyclic ethers.

5. 6,17α-dimethylpregnenolone.
6. 6,17α-dimethylpregnenolone acetate.
7. 6-methyl-17α-ethylpregnenolone.
8. 6-methyl-17α-ethylpregnenolone acetate.
9. 17α-n- propylprogesterone.
10. 17α-n-butylprogesterone.
11. 17α-n-propylpregnenolone.
12. 17α-n-butylpregnenolone.

References Cited by the Examiner

Deghenghi et al.: "Tetrahedron Letters," No. 11, pages 489–491 relied on. (1962.)

Deghenghi et al.: J. Amer. Chem. Soc., Volume 83, 4668 (1961).

Weiss et al.: "Chemistry and Industry" Jan. 19, 1963, pages 118–119 relied on.

LEWIS GOTTS, *Primary Examiner.*